United States Patent Office 3,538,235
Patented Nov. 3, 1970

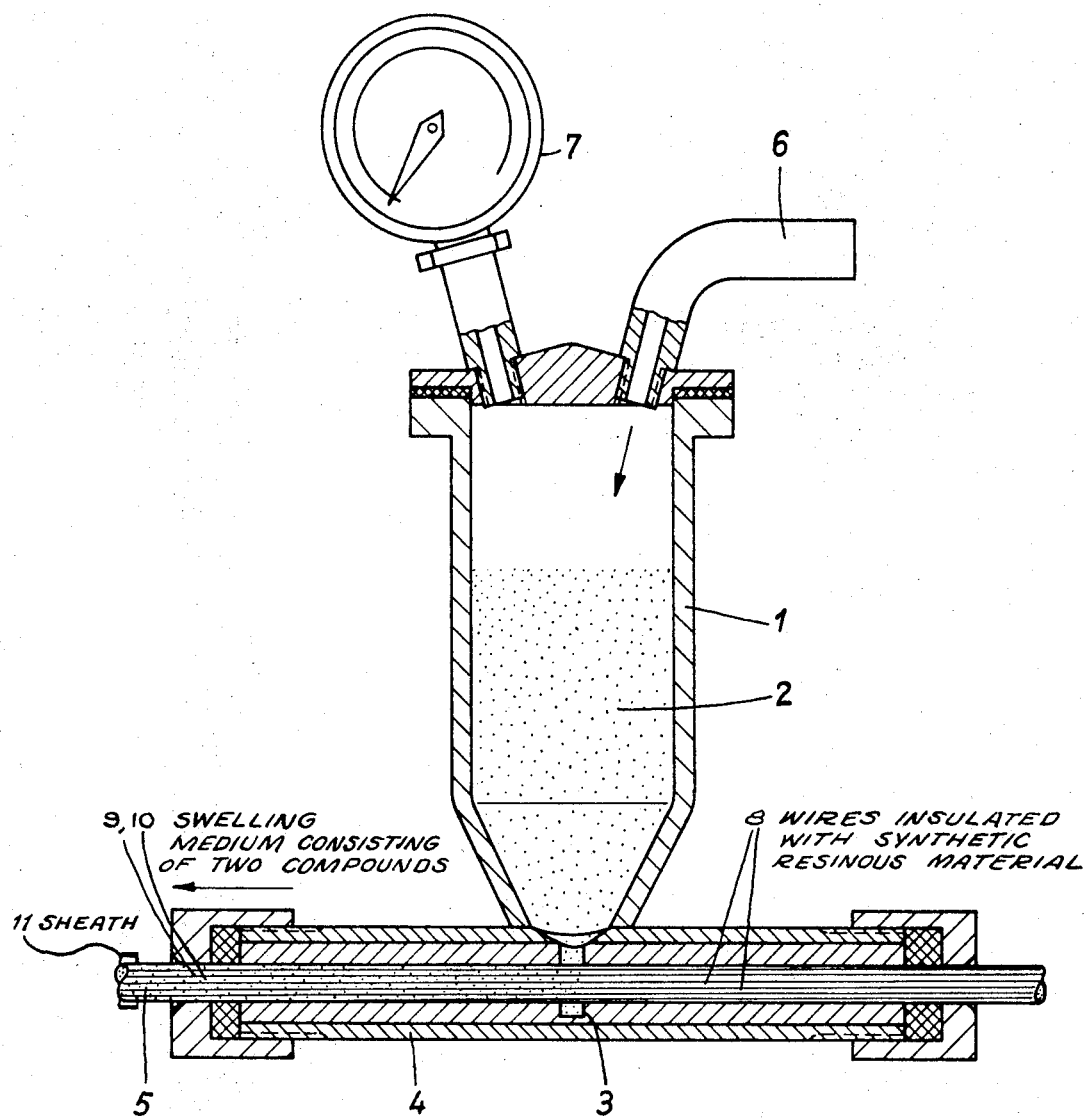

3,538,235
METHOD OF MAKING TELECOMMUNICATIONS CABLES
Ilse Arendt, Peter Wappler, Werner Götze, and Peter Schmidt, Berlin, Germany, assignors to Siemens Aktiengesellschaft, Berlin, Germany, a corporation of Germany
Filed Nov. 26, 1968, Ser. No. 779,062
Claims priority, application Germany, Nov. 27, 1967, 1,690,095
Int. Cl. H01b 7/28
U.S. Cl. 174—23    3 Claims

ABSTRACT OF THE DISCLOSURE

Described is a telecommunications cable comprising a cable core of wires insulated with synthetic resinous material, and a sheath surrounding said core. A powdered mixture is disposed in the space between the wires of the core and is loosely packed over the full length of the cable. This mixture has a first component capable on contact with moisture of rapidly swelling into a viscous material inhibiting axial penetration of moisture along the cable, and a second component which on contact with moisture over a period of time longer than that required for the conversion of said first component into said viscous material, expands to many times its original volume and/or is converted by swelling into a material having a substantially higher viscosity than that of the viscous material into which said first component is converted.

---

This invention relates to telecommunications cables. With such cables there is the danger that in the event of any damage to the sheath any moisture entering the cable may penetrate axially along the cable so that a large section of cable becomes waterlogged.

This risk of the axial penetration of moisture entering the cable at damage sites is particularly high in the case of telecommunications cables having wires insulated with synthetic resinous material, because such wires offer no resistance to axial penetration of entering moisture.

It has therefore previously been proposed in British Pat. No. 1,006,897 to provide telecommunications cables having wires insulated with synthetic resinous material with moisture barriers at specific intervals, these barriers preventing any axial penetration beyond them, of water which may have entered the cable. In one known cable of this kind, at specific intervals the interspaces between the individual wires and the sheath are filled with a plastic material so that in the event of damage to the cable, only the section disposed between two such moisture barriers can become waterlogged. However, it has been found that the introduction of plastic material does not altogether overcome the difficulties. Because the plastic material has to be heated strongly in order to introduce it, there is subsequent shrinkage so that the requisite tight seal is not achieved. Moreover, the watertightness of the inserted plug of material is reduced by the fact that the material cannot adequately follow volumetric changes taking place owing to temperature fluctuations. Finally, the watertightness of cables equipped with barrier plugs of this kind is questionable in circumstances where the cable is bent, for example, at the time of laying.

It has therefore been proposed in British Pat. No. 1,046,314 to introduce at appropriate intervals into a telecommunications cable having wires insulated by synthetic resinous material housed within a sheath, a substance which swells and increases its volume by many times in the presence of dampness or water, for example, bentonite, bentone, cross-linked dextrine, starch, cellulose derivatives, or alginates. This swelling material can be introduced into the cable, or stranded together with the wires in the form of strings, threads or strips. The swelling material may also, however, be introduced into the cable in the form of a gel. Yet again, it is known to introduce the swelling material in powder form into the cable and, for example, to introduce it in the form of a paste resembling petroleum jelly having a hydrocarbon or silicone base.

In the cables so far referred to, the barrier plugs used to provide a lengthwise seal are only provided locally in the cable. However, one ship's cable is already known from U.S. Pat. No. 2,507,508 which is filled over its entire axial length with an expandable material so that in the event of penetration of water into the cable core, axial spread is inhibited. In this known cable, bentonite, or polymers such as polyvinyl-alcohol, methylcellulose, cellulose acetate, or certain other celluloses, are introduced into the cable core in a dry, powdery state. The important thing is that these substances swell, so that longitudinal penetration of any water entering the cable at a damage site is inhibited.

The present invention is also concerned with a telecommunications cable having wires insulated with synthetic resinous material surrounded by a sheath, in which the space between the wires of the cable is loosely packed over the full length of the cable with a granular, powdery material which swells on contact with moisture or water.

In accordance with the invention, there is provided a telecommunications cable comprising a cable core of wires insulated with synthetic resinous material surrounded by a sheath, wherein the space between the wires of the core is loosely packed over the full length of the cable with a powdered mixture of a first component which on contact with moisture or water is very rapidly converted by swelling into a viscous material which inhibits axial penetration of dampness or water along the cable, and a second component of the pulverulent mixture which on contact with dampness or water over a period of time longer than that required for the conversion of said first component into said viscous material, expands to many times its original volume and/or is converted by swelling into a material having a substantially higher viscosity than that of the viscous material into which said first component is converted.

The drawing shows one form of apparatus, in schematic side view, partially in section, for applying the materials of the invention to the cable.

Since the first component of the powdered mixture introduced into the cable core swells very rapidly to form a viscous material, in the event of any penetration of water its axial spread is immediately slowed down and restricted. Thus, the flow rate of the penetrating water is reduced. The second component of the mixture then swells over a substantially longer period of time to many times its orginal volume and/or forms a material having a substantially higher viscosity than that of the material formed by the first component on swelling, so that it forms a stable structure of extremely high flow resistance. In this manner, it is ensured that the viscous material forming immediately after penetration of water as a consequence of the swelling of the first component, is not washed away by the prevailing water pressure. Thus, the invention ensures that, on the one hand, immediate inhibition of axial penetration of entering water is ensured and, on the other hand, even if the water is active for a long time, the resultant barrier plug is not washed out.

In order to achieve the most effective possible action in accordance with the invention, the most thorough possible mixing of the two components of the powdered mixture should be effected. In order that, during further processing of the cable, and in particular during transportation and during laying, there should be no unmixing of the two components, it is advisable, as far as possible, to make the grain sizes of the two components of the mixture equal and also, as far as possible, to ensure that the most uniform possible grain size distribution curve is achieved in the two components.

Because the mixture used in accordance with the invention acts by swelling in the event of any damage to the cable, it is sufficient to fill only part of the space between the wires of the cable core with the powdered mixture. The degree of filling of this space depends upon the expandability of the mixture used. Generally speaking, the space between the wires of the cable core will be filled over the whole length of the cable to an extent of about 20 to 30% with the powdered or granular mixture.

The grain size of the two components of the powdered mixture is conveniently selected to be within the range of 40 to 150μ. The lower limit for grain size is determined by the economics of the pulverizing process, while the upper limit for grain size is determined by the cable design. The grain size should not exceed the average wire spacing.

Because of the loose filling of only part of the space between the wires of the cable core, it is moreover ensured that the operating capacitance of the cable does not exceed the permissible values set down by the postal authorities.

The powdered mixture used in the present invention must be dry. If necessary, the mixture must be subjected to a drying process before its introduction into the cable core. In order to prevent any mold formation during the operational life of the cable (which may be several decades), it is also advisable to add to the powdery mixture a commercially available fungicide.

The critical factor, so far as the component materials used in the invention are concerned, is that they should swell in water; they may be indeed water-soluble. Which material is the first one to become active on contact with water or moisture, i.e. the one to become active in the shortest time, and which is the second slow-response component, depends upon the swelling characteristics of the materials involved. The swelling characteristic is dependent upon the particle size and in particular upon the particle shape of the powdered material. As far as the viscosity characteristic is concerned, the molecular weight also lays a part in this. Particularly in the case of the first, fast-acting component, it is also, of course, essential that the component should have a hydrophilic surface characteristic produced, for example, by suitable pretreatment of the material.

In selecting and making up the powder mixture used in the invention, therefore, the two components can also have the same or similar chemical structures. The sole essential so far as their use in the present invention is concerned, is that the two components should have different swelling properties, for example, produced by choice of particle size, particle shape and molecular weight, as well as a hydrophilic surface characteristic. The first component is so selected that it acts extremely rapidly in the presence of moisture, i.e., it forms a viscous substance in an extremely short time, which prevents further axial penetration of any water which has entered the cable. The second component of the powdered mixture, on the other hand, swells to an extraordinarily large extent over a substantially longer time, and attains such a high viscosity that it forms a solid structure of high flow resistance in the cable core. Consequently, the second, slow-swelling component of the powdered mixture seals off the cable core completely, at the low water flow rate, determined by the viscous substance produced by swelling of the first component, so that even under circumstances of high water pressure and long-term action of such water pressure, washing out of the barrier plug formed is virtually impossible.

In selecting the two components, however, it must be borne in mind that neither the operating capacitance nor the dielectric constant or loss factor of the cable must assume values which exceed those laid down by the postal authorities.

As examples of materials which are suitable for use in the present invention, polysaccharides may be mentioned. Of these materials, we have found cellulose ethers in particular, such as methylcellulose or carboxymethylcellulose, and also animal and vegetable starches or decomposition products and derivatives thereof, to be especially suitable. Equally suitable, however, are other natural substances having a polysaccharide character, such as pectines, alginates, tragacanth, agar-agar, cross-linked dextran and derivatives of galactose or mannose. Compounds of the last two kinds have been found to be excellently suited for use in the present invention.

Also suitable for use in the invention are: polyoxyalkenes and particularly polyoxyethylenes; polyvinyl derivatives, such as polyvinylpyrrolidone, polyvinylether and in particular polyvinylmethylether; polyacrylic acid derivatives, in particular ammonium and sodium salts of polyacrylic acid; and expandable inorganic compounds, such as diatomaceous earths, as well as silicates and derivatives thereof, for example bentonite or bentone.

It is an essential feature of the invention that in every case, two components having either identical or different chemical structures are combined, which components differ from one another in terms of their swelling behavior in such a fashion that one serves as the fast-acting first component and the other as the slow-acting second component in accordance with the invention.

The slow-acting component may, for example, be a polyvinyl alcohol.

Derivatives of galactose or mannose, which are soluble in cold water, have proved to be particularly suitable. A suitable example of a derivative of this kind is the material marketed under the trade name of "Meypro-Guar" by Meyhall Chemical A.G., Kreuzylingen, Switzerland. The material is a natural hydrocolloid which is obtained from the seed of the guar pod (*Cyanopsis tetragonoloba*). A characteristic feature of the guar molecule is an elongated main chain of mannose units, which has only single-membered galactose branches. The progressive connection of the mannose in the main chain takes place at the $\beta$-(1-4)-position, while the galactose of the side branches is $\alpha$-(1-6) glycocidically bound. Because this cold water soluble hydrocolloid is marketed in a variety of types, with differing rates of hydration, it can be employed in the present invention as both the first and as the second component.

A particularly favorable example of a powdered mixture suitable for the implementation of the present invention is constituted by the powdered hydrocolloid marketed under the trade name "Meypro-Guar" by the firm of Meyhall Chemical A.G. under the type references "M 175" and "B 5," as the first component, and a carboxymethylcellulose marketed under the trade name "Tylose MH 4000 P" by the firm of Kalle & Co. A.G., Wiesbaden-Biebrich, Germany, as the second component. A cable plug with a power mixture of this kind, the cable sheath having been peeled away down to a diameter corresponding to the cable diameter, was buried in mud. Under the action of a 1 meter head of water, there formed at either side of the bared section, an approximately 2 cm. wide plug which prevented axial penetration of the water acting on the cable core.

In order to manufacture a telecommunications cable in accordance with the invention, a suspension of the powdered mixture in a non-aqueous, highly volatile liquid may be formed, this suspension being introduced into the as yet unsheathed cable core or into an element thereof, whereupon the high volatility liquid is evaporated. The non-aqueous highly volatile liquid can, for example, be a halogenated hydrocarbon having a boiling point of below 55° C. In order to better secure the expandable powdered mixture within the cable, small quantities of a substance which creates adhesive properties in such a suspension can be added. In order that the suspension should be stable, it is moreover advisable to adapt the density of the suspension to the density of the powdered mixture.

A suspension which can be employed in the present invention may, for example, have the following composition (in percent by weight):

80% halogenated hydrocarbons, e.g. Freon, mixed with benzene hydrocarbons
2% of a bonding substance, e.g. polyisobutylene
17% of the expandable powdered mixture
1% of an anti-precipitant The suspension containing the powdered mixture can be introduced into the cable core or into an element thereof, by passing the cable core, after the stranding operation, through a vessel containing the suspension, complete impregnation taking place therein. Subsequently, the liquid, i.e., the liquid phase of the suspension, is driven off by means of an air blast. The penetration of the suspension into the spaces between the wires of the cable core can be promoted by mechanical stirring inside the impregnating vessel, or by using ultrasonic techniques.

The suspension can also be introduced into the core spaces by nozzles or by rotating elements provided in the stranding machine and which scatter the suspension off tangentially. A further possible way of introducing the suspension is to render the suspension conductive by adding polar solvents to it, so that it can be introduced into the core by the application of an electrostatic field.

After the vaporization and volatilization of the solvent, it is advisable to wrap a tape around the cable core in order that the dry powdered mixture left behind should not fall out during further processing.

A particular advantage of the invention resides in the fact that in the finished cable, the powdered, expandable mixture is present alone without any additional carrier substance. The method of introducing the powdered mixture in the form of a suspension, as described above, does, it is true, employ an auxiliary agent, namely a non-aqueous, highly volatile liquid, in order to introduce the mixture, but this auxiliary agent does not remain in the cable.

However, this auxiliary agent can also be dispensed with in accordance with a further embodiment of the invention, so that the additional operation of volatilizing this liquid can be omitted. For this purpose, the powdered mixture is introduced into the as yet unsheathed cable core or an appropriate element thereof by the creation of a pressure difference between the vessel containing the powdered mixture and the core or part thereof into which it is to be filled. In this way, it is ensured that the powdered mixture only is introduced into the core, there being no risk of the permanent introduction of foreign bodies.

In order to produce the required pressure difference, compressed air can be fed into the vessel containing the powdered mixture. The powdered mixture may also, however, be entrained by an air or gas stream flowing into the as yet unsheathed cable core or into an element thereof.

One form of apparatus for carrying out this method is shown as a schematic side view, partly in section, in the drawing. An expandable powdered mixture 2 of materials as described above for use in the invention is contained in a vessel 1. The funnel-like lower end of the vessel 1 opens into an annular space 3 formed in a cylindrical guide 4, through the bore of which a cable core 5 is fed from right to left in the drawing. Compressed air can be supplied to the top part of the vessel 1 via a tubular line 6. The level of the pressure prevailing inside the vessel 1 is indicated by a pressure gauge 7.

Because of the superatmospheric pressure (about 7 to 10 atmospheres gauge) prevailing inside the vessel 1, the powdered mixture 2 is forced through the annular space 3 into the cable core 5. The size of the annular space 3 is selected to accord with the diameter of the cable core 5. The powdered miture 2 consisting of two components 9 and 10, because of the nozzle-like design of the annular space 3, is deposited firmly in the cavities between insulated wires 8 of the core, and in fact uniformly over the core cross-section.

After the core containing the powdered miture has left the left-hand end of the cylindrical guide 4, a tape or sheath 11 is spun around it by a device (not shown) in order to ensure that the powdered mixture does not fall out of the core during further processing of the latter.

The above-described manner of inserting the powdered mixture can be modified in many ways without departing from the scope of this invention.

The cable 5 consists of individual wires 8, insulated from each other by synthetic plastic and by a sheath 11. The swelling medium consists of two components 9 and 10.

We claim:
1. A telecommunication cable comprising a cable core of wires insulated with synthetic resinous material, a sheath surrounding said core, a powdered mixture disposed in the space between the wires of the core and loosely packed over the full length of the cable, said mixture consisting of two pulverulent components, each of them having a grain size of from 40 to 150μ and both of them having at least approximately the same grain size distribution curve, said first component being capable on contact with moisture of rapidly swelling into a viscous material inhibiting axial penetration of moisture along the cable, and said mixture having a second component being capable on contact with moisture of swelling into a viscous material having a substantially higher viscosity than that of the viscous material into which said first component is swelled by expanding to many times its original volume over a period of time longer than that required for the conversion of said first component.

2. The telecommunication cable of claim 1, wherein the space between the wires of the core is filled with said powdered mixture to an extent of about 20 to 30% over the full length of the cable.

3. The telecommunication cable of claim 1, wherein said powdered mixture includes a fungicide.

References Cited
UNITED STATES PATENTS
3,347,974   10/1967   Arendt _____ 174—23

E. A. GOLDBERG, Primary Examiner

U.S. Cl. X.R.
174—113, 118

PO-1050
(5/69)

UNITED STATES PATENT OFFICE
CERTIFICATE OF CORRECTION

Patent No. 3,538,235      Dated November 3, 1970

Inventor(s) ISLE ARENDT et al

It is certified that error appears in the above-identified patent and that said Letters Patent are hereby corrected as shown below:

In the heading the German priority number should read as follows: --P 16 90 095.1--

JAN. 19, 1971

(SEAL)
Attest:
Edward M. Fletcher, Jr.
Attesting Officer

WILLIAM E. SCHUYLER, J
Commissioner of Patent